United States Patent [19]
Vertogen et al.

[11] Patent Number: 5,839,570
[45] Date of Patent: Nov. 24, 1998

[54] CONVEYOR

[75] Inventors: Martinus Johannes Maria Vertogen, Zeeland; Jacobus Marie van den Goor, Nuenen, both of Netherlands

[73] Assignee: Vanderlande Industries Nederland B.V., Veghel, Netherlands

[21] Appl. No.: 568,501

[22] Filed: Dec. 7, 1995

[30] Foreign Application Priority Data

Dec. 9, 1994 [NL] Netherlands ............. 9402081

[51] Int. Cl.$^6$ ................................. B65G 15/02
[52] U.S. Cl. ............................................ 198/831
[58] Field of Search ............................ 198/831, 840

[56] References Cited

U.S. PATENT DOCUMENTS

| 5,060,788 | 10/1991 | Compton et al. | 198/831 |
| 5,332,083 | 7/1994 | Axmann | 198/831 |

FOREIGN PATENT DOCUMENTS

| 0 566837 | 10/1993 | European Pat. Off. . |
| 1 230560 | 9/1960 | France . |
| 1 120977 | 12/1961 | Germany . |
| 5 24622 | 2/1993 | Japan . |

OTHER PUBLICATIONS

U.S. application No. 08/779,238, file Jan. 3, 1997 pending.

*Primary Examiner*—Joseph E. Valenza
*Attorney, Agent, or Firm*—Oblon, Spivak, McClelland, Maier & Neustadt, P.C.

[57] ABSTRACT

A conveyor provided with an endless conveyor belt making a curve, which near its ends is passed over rollers journalled in a frame, and which can be driven during operation. A collar is provided near one edge of the belt located on the outer side of the curve, which collar is engaged by guide rollers supported by the frame. A guide roller engaging a collar is capable of pivoting movement about a pivot axis, which extends at least substantially parallel to the belt part supporting the collar and which, as seen in a longitudinal direction, is located on the side of the collar remote from the side that cooperates with the guide roller. Furthermore a mechanism is provided by which the guide roller can be locked against being pivoted about the pivot axis when the guide roller is in engagement with the collar.

6 Claims, 5 Drawing Sheets

# CONVEYOR

BACKGROUND OF THE INVENTION

1. Field of the Invention

The invention relates to a conveyor provided with an endless conveyor belt making a curve, which near its ends is passed over rollers journalled in a frame, and which can be driven during operation, whereby a collar is provided near one edge of said belt located on the outer side of said curve, which collar is engaged by guide rollers supported by said frame.

2. Discussion of the Background

A conveyor of this type is known from European Patent Application 0 566 837.

With this known conveyor the parts supporting the guide rollers are all positioned higher than the side of the belt, while the guide rollers can only be pivoted in a direction away from the belt, in such a manner that they will move towards the center of the belt upon pivoting upwards, while they will still be positioned higher than the belt after having pivoted upwards. A drawback of this known construction is that the guide rollers and the parts supporting said guide rollers constitute an impediment when fitting and/or exchanging the belt.

According to the invention a guide roller engaging a collar is capable of pivoting movement about a pivot axis, which extends at least substantially parallel to the belt part supporting the collar in question and which, seen in its longitudinal direction, is located on the side of the collar remote from the side that cooperates with the guide roller, while means are provided by which said guide roller can be locked against being pivoted about the pivot axis when the guide roller is in engagement with the collar.

When the construction according to the invention is used it will be possible to obtain a simple and efficient positioning and construction of the parts supporting the guide roller, whereby the guide roller can for example be pivoted in a direction away from the belt, toward the outer side thereof, in order to fit and/or exchange the belt.

With the construction according to European Patent Application 0 566 837 the guide rollers are furthermore capable of pivoting movement about pivot axes provided some distance above the guide rollers, while springs are provided, by means of which the guide rollers can be drawn against the collar provided on the conveyor belt. A drawback of this construction is that when the guide rollers are pivoted under the influence of the springs, the direction in which the guide rollers exert forces on the collar provided on the conveyor belt will change.

According to another aspect of the invention a guide roller engaging a collar is supported by a support capable of movement parallel to a belt part supporting the respective collar, and spring means acting on the support are provided, which attempt to move the support in such a manner that the guide roller supported by said support are pressed against the collar.

When the construction according to the invention is used a force of constant direction can be exerted via the guide roller on the collar provided on the conveyor belt, which is conducive towards even guiding of the conveyor belt through the curve, while this construction is much less sensitive to wear than the known construction.

The invention will be explained in more detail hereafter with reference to a few possible embodiments of the construction according to the invention diagrammatically illustrated in the accompanying Figures.

DESCRIPTION OF THE PREFERRED EMBODIMENTS

Figure 1:
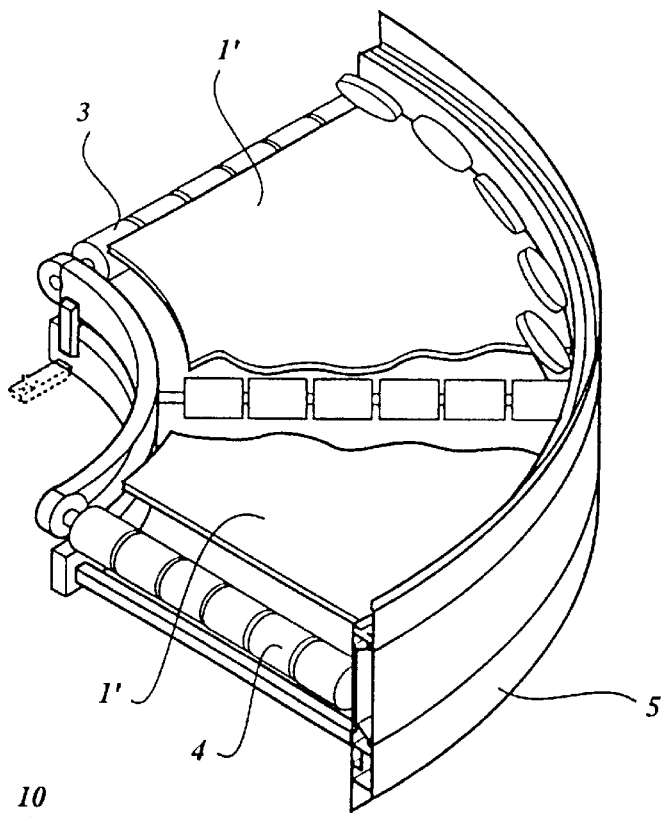
FIG. 1 is a perspective view of a part of a conveyor according to the invention, wherein parts of some components have been left out in order to show the parts located thereunder.
Figure 2:
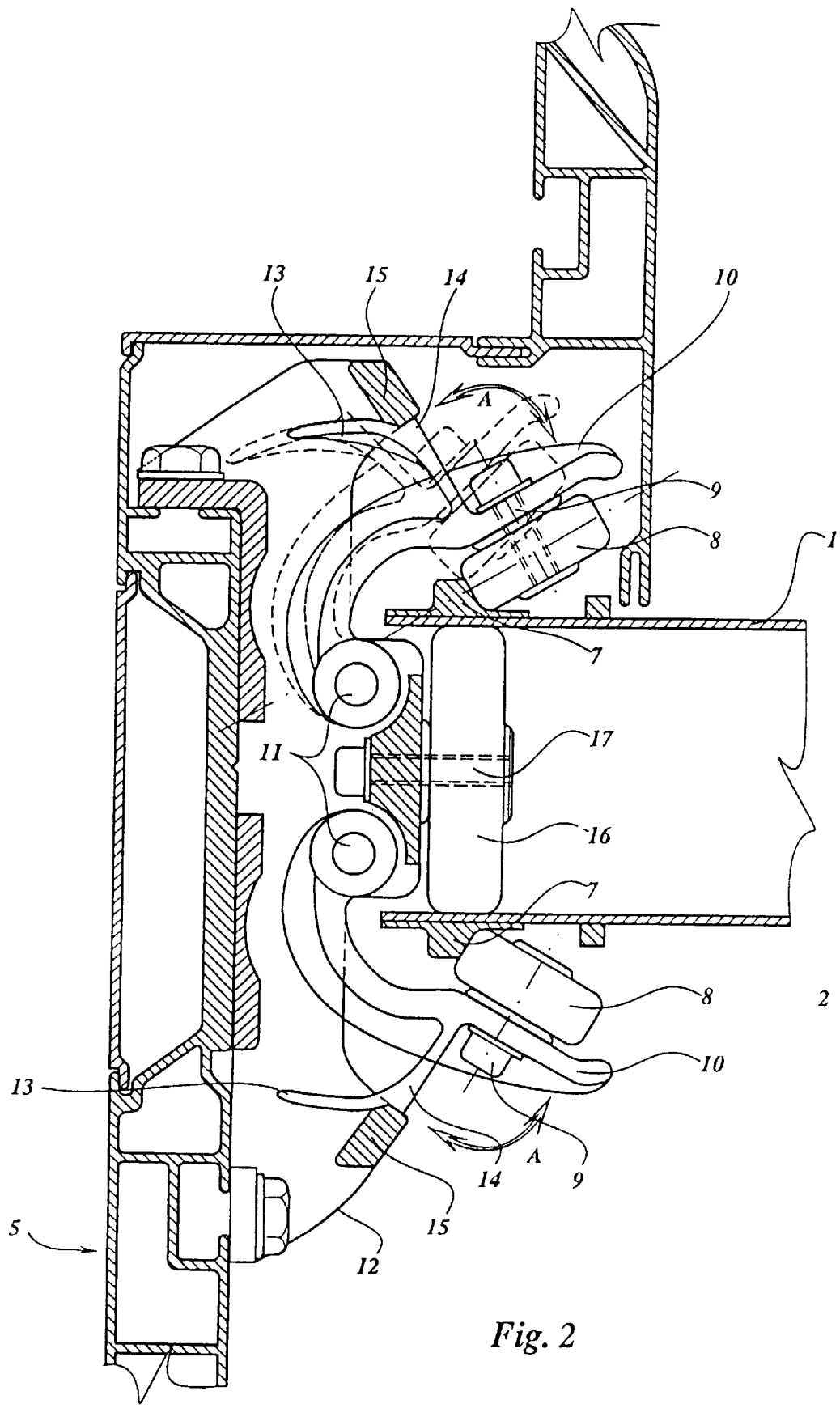
FIG. 2 is a larger-scale, sectional view of a part of the conveyor shown in FIG. 1, near the outer side of the curve.

As is diagrammatically illustrated in FIG. 2, a conveyor comprises an endless belt including an upper part 1 and a lower part 2, said belt near its ends being passed over rollers 3 and 4 (FIG. 1), whose axes of rotation include an angle of about 90° with each other in the illustrated embodiment. The rollers 3 and 4 are supported by a frame 5, which furthermore supports a guide plate 1' supporting said upper part 1 and rollers 6 guiding said lower part 2.

As is shown more particularly in FIG. 2, the conveyor belt comprising the two parts 1 and 2 is near the outer side of the curve provided with a projecting collar 7, which is secured to the conveyor belt and which extends the entire length of the conveyor belt, along one edge thereof. Said collar 7 is engaged by guide rollers or guide wheels 8, both under and above the conveyor belt. Each guide roller 8 is freely rotatable about a pin 9, by means of which the guide roller is secured to an arm 10. Each arm 10 is pivotally coupled, by means of a pivot pin 11, to a support 12 secured to the frame 5. As will be apparent from FIG. 2, the two pivot pins 11 of each group of two wheels 8 positioned one above the other are thereby likewise positioned one above the other near the outer side of the curve, beside the conveyor belt 1, 2. The pins 11 thereby extend parallel to the belt parts 1 and 2 and, as seen in a direction perpendicular to the belt parts, are positioned at least substantially tangentially with respect to the point of the belt at which a guide roller is capable of pivoting movement about the respective pivot pin 11 and engages the belt, in particular the collar 7. Furthermore it is apparent from FIG. 2 that the pivot pin of the upper guide roller 8 is disposed lower than the upper belt part 1 and that the lower guide roller 8 is disposed higher than the lower belt part 2. A plurality of such pairs of guide rollers 8 positioned one above the other is disposed along the outer edge of the curve.

Projecting wings 13 are mounted on the arms 10, at the sides of the arms 10 remote from the rollers 8, said wings being provided with projecting cams 14.

In the positions of the arms 10 and the wings 13 connected thereto which are illustrated in full lines in FIG. 2, the cams 14 are disposed behind ribs 15 forming part of the support 12, so that the rollers 8 being in engagement with the collar 7 cannot pivot away from the belt 1, 2. The construction is thereby such that the wings 13 of a resilient material can be pivoted with respect to the arms 10 so as to move the cams 14 away from their position under the ribs 15. Then the arms 10 carrying the guide rollers 8 can be pivoted in a direction away from the belt (arrow A), to the position illustrated in dotted lines at the top of FIG. 2. In this position the parts of the wings 13 positioned between the cams 14 and the arms 10 may abut against the ribs 15, so that the arms 10 are prevented from pivoting back. In this retracted position of the guide rollers 8 the belt can be readily fitted or exchanged. Then the arms 10 can be pivoted back to the position illustrated in full lines in FIG. 2, in which position the cams 14 are snapped under the ribs 15 again.

As is furthermore shown in FIG. 2, support 12 supports a supporting roller 16, which is secured to support 12 by means of a pin 17, about which supporting roller 16 is freely rotatable. It will be apparent that pin 17 extends parallel to belt parts 1 and 2, according to a radius of the curvature of the conveyor belt. Supporting roller 16 is thereby disposed in such manner as to engage the inner sides of the belt parts 1 and 2 near the points of engagement of a pair of guide rollers 8 positioned one above the other.

With the guide rollers 8 disposed in groups of two positioned one above the other along the outer circumference of the curve and the supporting rollers 16 disposed between each group of two guide rollers 8 an efficient and even guiding of the conveyor belt through the curve is realized.

Figure 3:
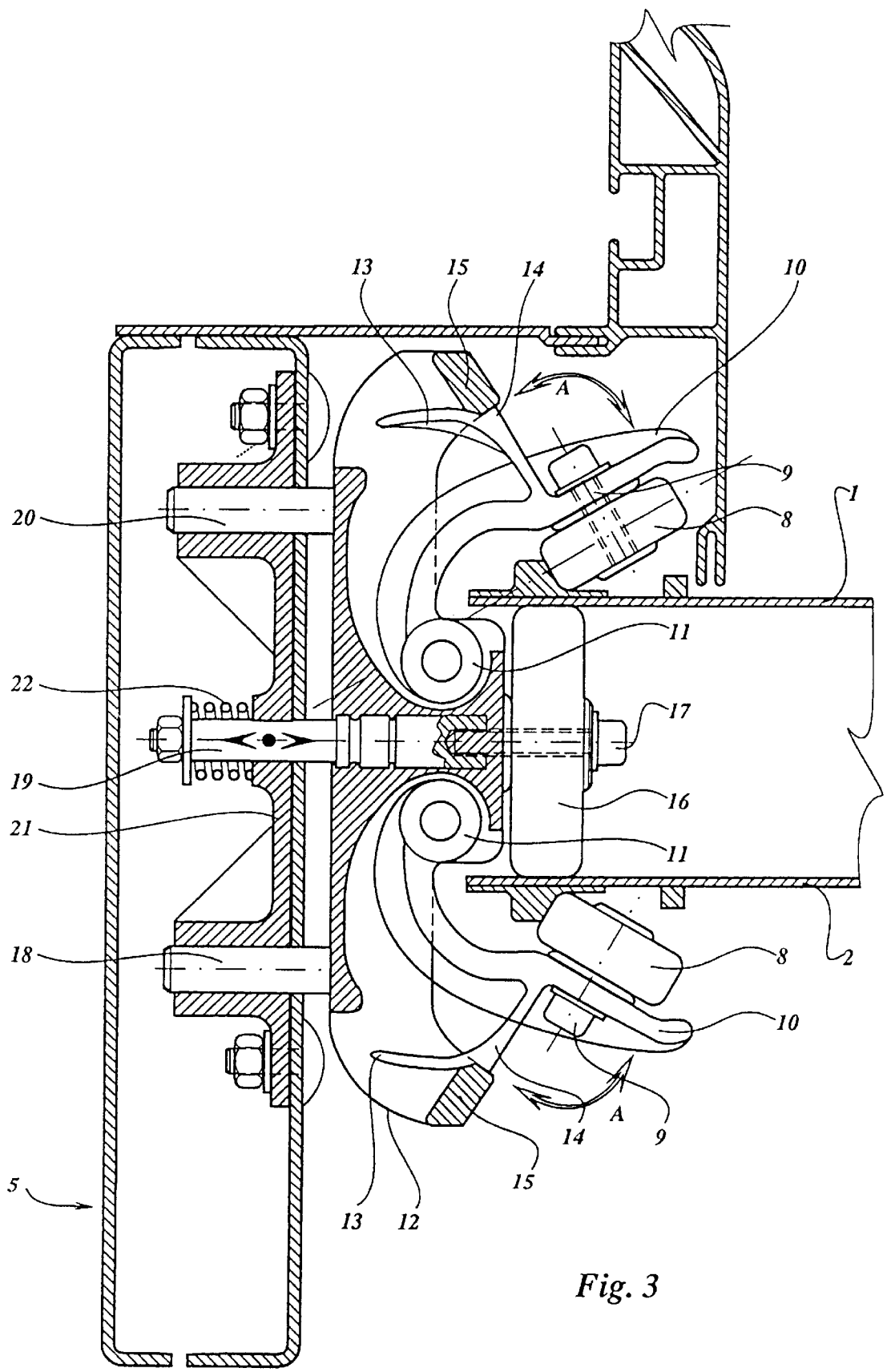
FIG. 3 is a sectional view corresponding with FIG. 2 of a second embodiment.

The embodiment diagrammatically illustrated in FIG. 3 largely corresponds with the embodiment shown in FIG. 2. Consequently like parts are numbered alike in the two Figures.

With the construction according to FIG. 3, however, support 12 is not fixedly connected to the frame 5, but a number of guide pins 18–20 extending parallel to the axis of rotation of supporting wheel 16 are secured to said support, said guide pins being capable of sliding movement in a longitudinal direction in bores which are provided in a supporting plate 21 secured to frame 5. A compression spring 22 is provided around the middle guide pin 19, which compression spring attempts to move the support 12 carrying the guide rollers 8 and the guide rollers 8 to the left, seen in FIG. 3, in a direction, therefore, in which the guide rollers 8 are pressed against the collar 7 of the belt. In this embodiment the guide rollers 8 can be moved under the influence of spring force in a direction parallel to the belt parts 1 and 2, so that movement of the guide rollers 8 will not result in a change of position of said guide rollers 8 with respect to the collar 7, thus making it possible to maintain an optimum contact between the guide rollers 8 and the collar 7 at all times.

Figure 4:
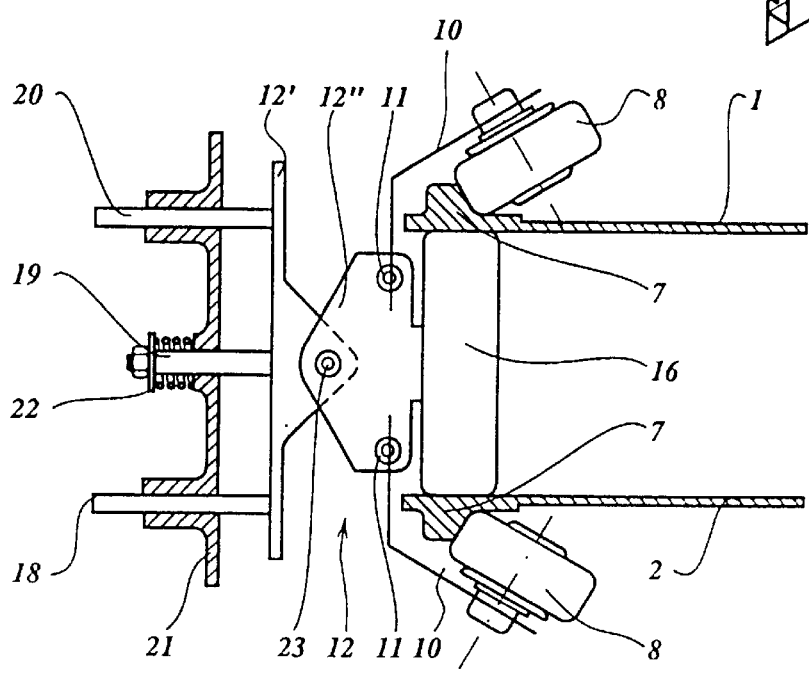
FIG. 4 is a diagrammatic, sectional view corresponding with FIGS. 2 and 3 of a third embodiment of the construction according to the invention.

FIG. 4 very schematically illustrates an embodiment which largely corresponds with FIG. 3. Consequently like parts are numbered alike in the two Figures. As will be apparent from FIG. 4, however, the support 12 of the embodiment shown in FIG. 4 is built up of two parts 12' and 12", with the guide pins 18–20 being secured to part 12', while the guide rollers 8 and the supporting roller 16 are coupled to part 12" of the support in a similar manner as described above with reference to the preceding embodiments. The two parts 12' and 12" are thereby pivotally coupled to a pivot pin 23 crossing the axis of rotation of supporting wheel 16 perpendicularly and extending parallel to the pivot pins 11. In case of any irregularities in the belt movement the part 12' supporting the guide rollers 8 is thus capable of adjusting itself to a small degree about the pin 23 during operation.

An advantage of the construction shown in FIGS. 3 and 4 is that in case of a possible elongation of the belt 1, 2, said belt is drawn towards the outer side of the curve by the guide rollers, thus remaining tensioned. This eliminates the necessity of using separate tensioning means for tensioning the belt.

Figure 5:
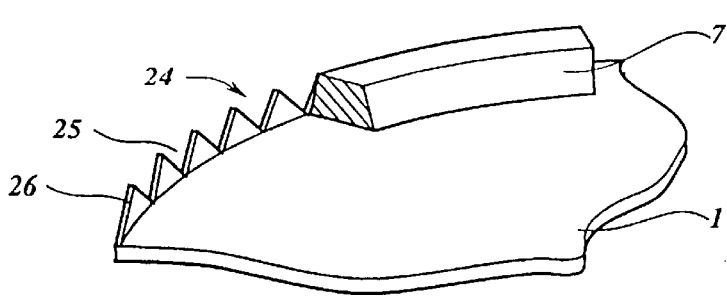
FIG. 5 is a perspective view of a part of a conveyor belt according to the invention, which is suitable for use in the devices shown in FIGS. 1–4.

FIG. 5 shows a possible embodiment of the attachment of a collar 7 to the belt 1, 2. As will be apparent from this Figure, the belt has a serrated edge 24, which is preferably folded through an angle of ±90°. As is apparent from the Figure, the spaces 25 between the teeth 26 of the folded edge 24 extend as far as the flat belt parts 1 and 2. Collar 7 is secured to the flat belt parts 1 and 2 with its bottom side and to the serrated edge 24 with its upstanding outer side. Thus an adequate bond between the belt and collar can be obtained, while the above-described serration of the vertical edge 24 of the belt 1, 2 enables said upstanding edge to follow the curve without any problem, without undesirable stresses being produced in the belt thereby.

FIGS. 6a–6e show successive steps of a method for providing a collar on a conveyor belt 1, 2 as described above.

Figure 6A:
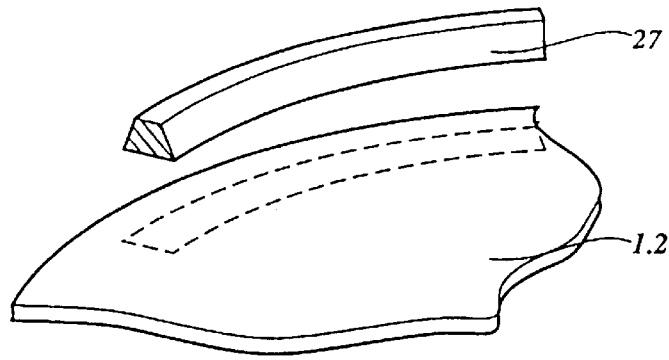
FIGS. 6a–6e show successive steps for providing a collar on a conveyor belt.
Figure 6B:
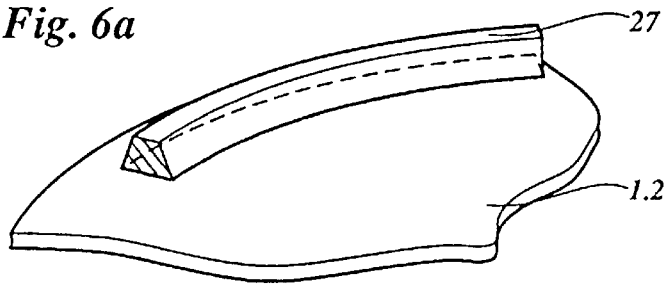
Figure 6C:
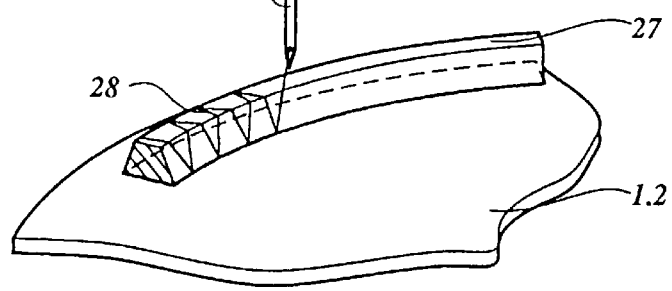

First a collar 27, which has a trapezoidal section in the illustrated embodiment, is placed on the belt 1, 2, at a short distance from the outer edge thereof (FIG. 6a), and fixed to the belt by glueing or vulcanizing (FIG. 6b).

Then the collar 27 is furthermore attached to the conveyor belt 1, 2 by mechanical means, for example by sewing, using a stitching wire 28, whereby the stitching wire 28 is provided over the collar in zigzag fashion by means of a sewing needle 29.

In order to prevent the stitching wire 28 from being damaged, in particular during operation by the guide rollers 8, a protective layer must be provided, at least on the side of the collar 27 facing the guide rollers 8.

Figure 6D:
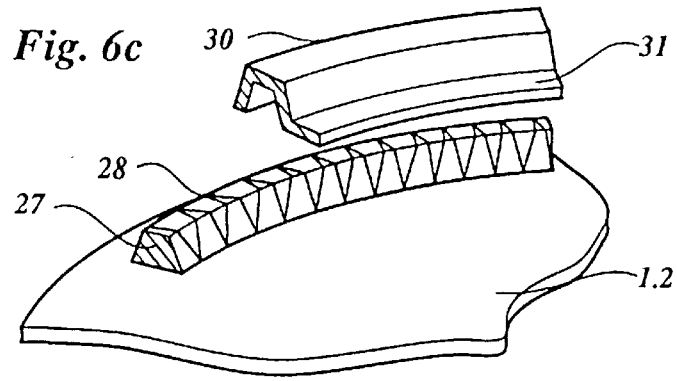
Figure 6E:
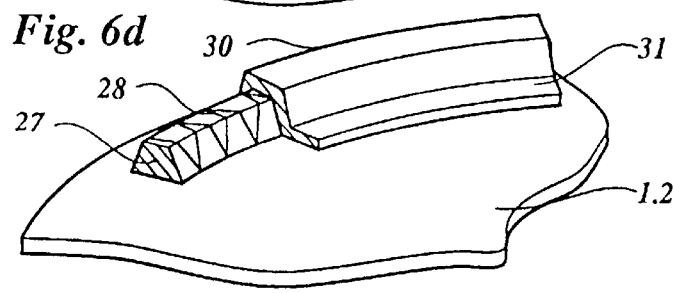

In the illustrated embodiment a cap-shaped cover 30 is utilized, which can be placed over the collar 27 in the manner shown in FIGS. 6d and 6e, so that both sides and the upper side of the collar 27 are covered by the cap-shaped means 30. Preferably said cap-shaped means is furthermore designed to have a projecting edge portion 31, which will abut against the upper surface of the conveyor belt 1, 2 in the manner shown in FIG. 6e. Following this said capshaped means 30 may be fixed to the conveyor belt 1, 2 and to the collar 27 by glueing or vulcanizing.

In the above-described manner a particularly solid connection of the collar 27 and the cap-shaped means 30 to the conveyor belt 1, 2 is obtained.

Figure 7A:
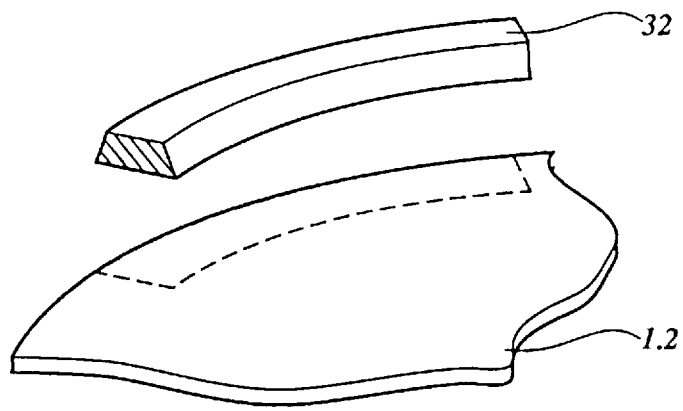
FIGS. 7a–7c show successive steps for providing a collar on a conveyor belt.
Figure 7B:
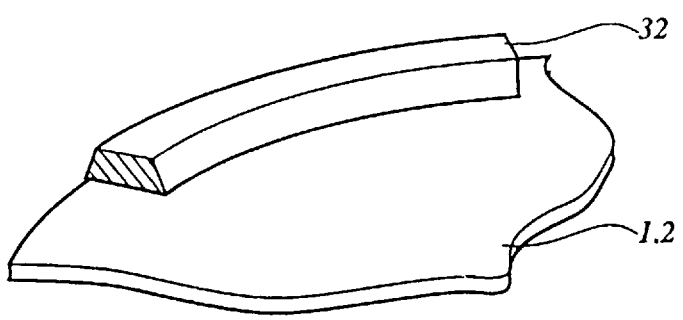
Figure 7C:
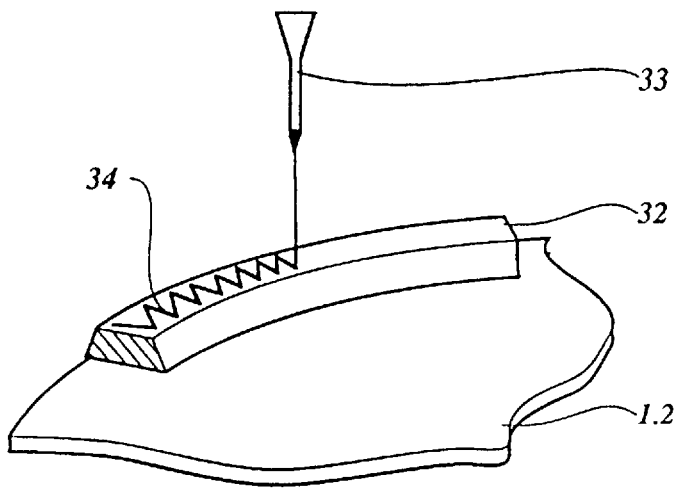

FIGS. 7a–7c show a method corresponding with FIG. 6 for fixing a collar 32 having a trapezoidal section to the conveyor belt 1, 2. Also in this embodiment the collar is placed on the conveyor belt 1, 2 and fixed thereto by glueing or vulcanizing in a similar manner as described above with reference to FIG. 6. Then the collar 32 is sewed onto conveyor belt 1, 2 by means of a stitching wire 34, utilizing a sewing needle 33.

Unlike the embodiment according to FIG. 6 the stitching wire is passed through the material of the collar 32 in this embodiment, and not along the sides thereof. In this manner a cover protecting the stitching wire, as used in the embodiment according to FIG. 6, is not required.

It will be apparent that the stitching wire used in FIGS. 6 and 7 as the mechanical connecting means to effect an additional attachment between collar and conveyor belt may be replaced by other mechanical fastening means, for example fastening means in the shape of pop rivets or the like.

We claim:

1. A conveyor, which comprises:

an endless conveyor belt having a curved portion;

a frame having two rollers journalled thereon and oriented so as to form an angle therebetween, said endless belt being guided around said rollers and at least one of said rollers being drivable during operation;

a plurality of guide rollers;

a collar located in proximity with an edge portion of said belt and located on an outer side of said curved portion, said collar being engageable with said guide rollers;

a support supporting said guide rollers, said support being movable parallel to a portion of said belt;

a spring acting on said support and moving said support in a manner such that the guide rollers supported by said support are pressed against the collar; and a pivot axis about which one of said guide rollers is pivotable from an operative position cooperating with said collar in a direction away from said belt wherein said pivot axis is positioned beside the belt, as seen in a longitudinal direction of said pivot axis.

2. A conveyor, which comprises:

an endless conveyor belt having a curved portion;

a frame having a plurality of guide rollers journalled thereon;

a support roller positioned between said guide rollers and engageable with the belt;

a collar positioned in proximity with an outer surface of said belt and located on an outer side of said curved portion, said collar being engageable with said guide rollers wherein said guide rollers are pivotable about a pivot axis which extends at least substantially parallel to a portion of the belt supporting the collar and which, as viewed in a longitudinal direction, is located on a side of the collar remote from a side of the collar which is cooperable with at least one of the guide rollers; and an arm to support one of said guide rollers.

3. A conveyor according to claim 2, wherein the pivot axis, about which said at least one guide roller is pivotable and wherein said at least one guide roller, when in an operative position, comprises guide rollers which are positioned on opposite sides of the belt on which said guide rollers act, as seen in a direction perpendicular to said belt.

4. A conveyor according to claim 1, wherein said guide rollers are disposed in first and second groups positioned one above the other wherein a guide roller of a first group acts on a first part of said belt and a guide roller of said second group acts on a second part of the belt.

5. A conveyor as claimed in claim 2, which comprises a locking mechanism locking at least one of said guide rollers against being pivoted about the pivot axis when said at least one guide roller is in engagement with the collar wherein the locking mechanism comprises a wing which is connected to said arm and wherein said wing is pivotable against a spring force with respect to said arm, said wing having a projecting cam which is engageable with a stop member to secure the arm in an operative position.

6. A conveyor as claimed in claim 1, which comprises a spring biasing said support in a manner such that the guide rollers are pressed against the collar.

* * * * *